United States Patent Office 2,760,910
Patented Aug. 28, 1956

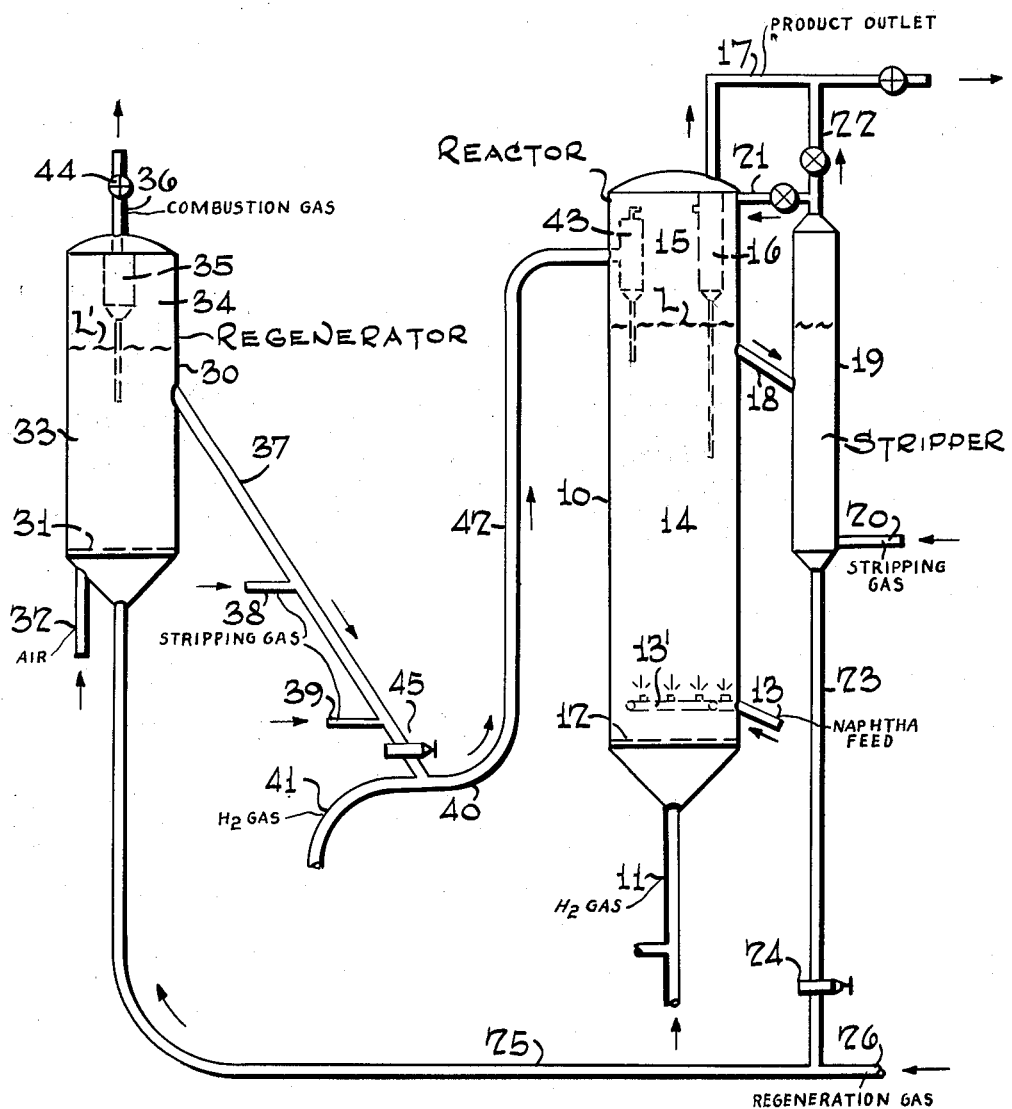

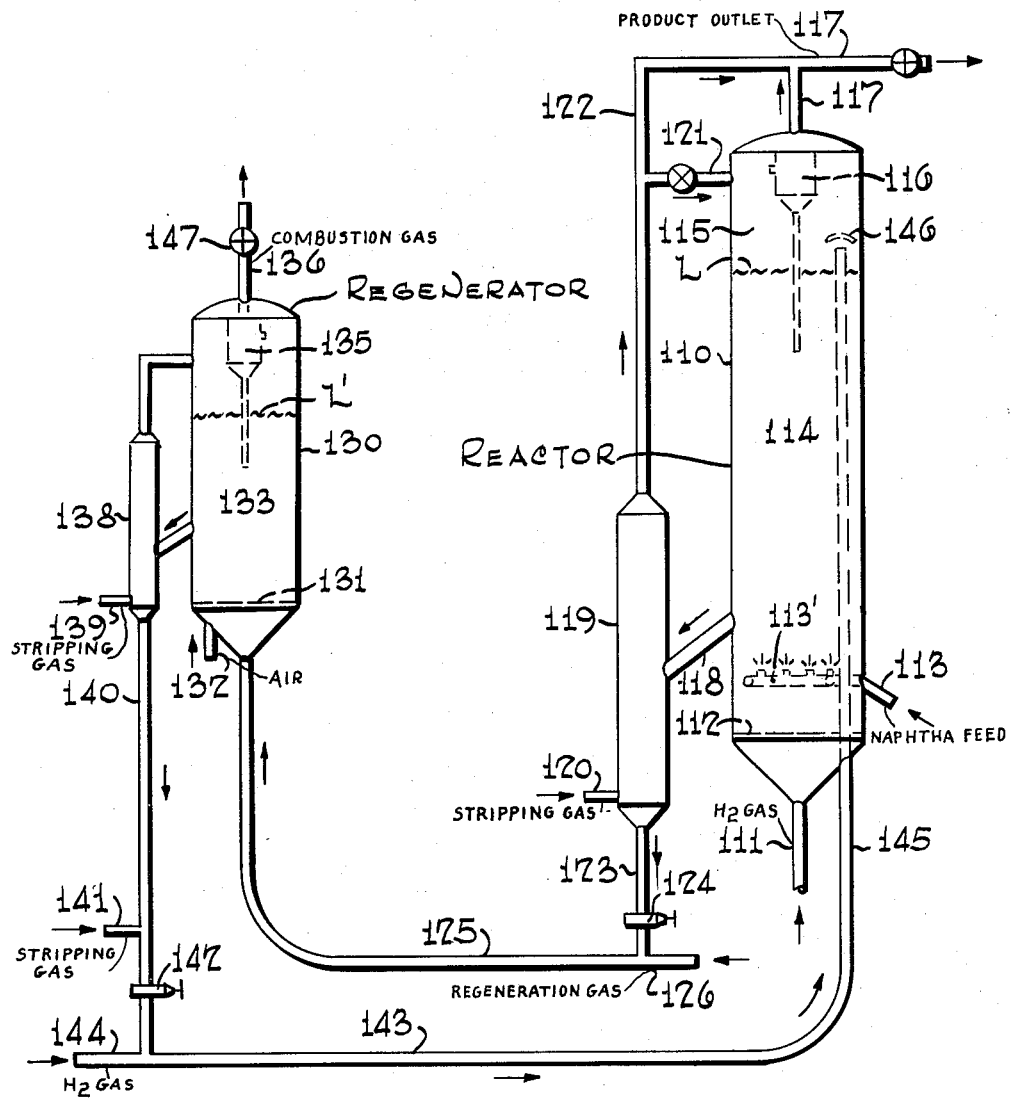

2,760,910
FLUID HYDROFORMING

Robert J. Fritz, John F. Moser, Jr., Lloyd A. Nicolai, and Edward W. S. Nicholson, Baton Rouge, La., assignors to Esso Research and Engineering Company, a corporation of Delaware Application December 26, 1951, Serial No. 263,444

3 Claims. (Cl. 196—50)

This invention relates to the catalytic conversion of hydrocarbon fractions boiling within the motor fuel boiling range of low knock rating into high octane number motor fuels rich in aromatics and particularly to a process whereby such a conversion is effected by the fluidized solids technique.

Hydroforming is a well known and widely used process for treating hydrocarbon fractions boiling within the motor fuel or naphtha range to upgrade the same or increase the aromaticity and improve the antiknock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are ordinarily carried out in the presence of hydrogen or hydrogen-rich recycle gas at temperatures of 750–1150° F. in the pressure range of about 50–1000 lbs. per sq. inch and in contact with such catalysts as molybdenum oxide, chromium oxide or, in general, oxides or sulfides of metals of Groups IV, V, VI, VII and VIII of the Periodic System of elements, alone, or generally supported on a base or spacing agent such as alumina gel, precipitated alumina or zinc aluminate spinel. A good hydroforming catalyst is one containing about 10 wt. per cent molybdenum oxide upon an aluminum oxide base prepared by heat treating a hydrated aluminum oxide or upon zinc aluminate spinel.

It has been proposed in application Serial No. 188,236, filed October 3, 1950, to effect the hydroforming of naphtha fractions in a fluidized solids reactor system in which naphtha vapors are passed continuously through a dense, fluidized bed of hydroforming catalyst particles in a reaction zone, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted has several fundamental advantages over fixed bed hydroforming such as (1) the operations are continuous, (2) the vessels and equipment can be designed for single rather than dual functions, (3) the reactor temperature is substantially constant and (4) the regeneration or reconditioning of the catalyst may be readily controlled.

A particular advantage of the foregoing fluid solids operation has been the fact that the freshly regenerated catalyst can be utilized to carry part of the heat required for the hydroforming reaction from the regeneration zone into the reaction zone. It has been proposed in this connection to discharge hot, regenerated catalyst particles from the regenerator standpipe into a stream of hot, hydrogen-rich recycle gas in a transfer line whereby the catalyst particles are subjected to a reconditioning treatment involving at least a partial reduction of higher oxides of the catalytic metal formed during regeneration to a lower or more catalytically active form of catalytic metal oxide during its passage through the transfer line into the reaction zone. In view of the high temperature of the regenerated catalyst (1100–1300° F.) and the exothermic character of the reaction between the hot, freshly regenerated catalyst and the hydrogen it is necessary to make the transfer line very short in order to keep the time of contact of the catalyst and hydrogen-containing gas sufficiently short to avoid overtreatment and/or thermal degradation of the catalyst.

It is the object of this invention to provide a novel method for treating freshly regenerated hydroforming catalyst preparatory to recycling the same to a fluidized solids hydroforming reaction zone.

It is a further object of this invention to provide a novel method for treating the freshly regenerated hydroforming catalyst at high temperatures for very short periods of time.

It is also an object of this invention to provide a novel method for treating freshly regenerated hydroforming catalyst at high temperatures for short periods of time while causing the gaseous products from the pretreatment to by-pass the main reactor bed.

These and other objects will appear more clearly from the detailed specification and claims which follow.

It has now been found that hot, freshly regenerated hydroforming catalyst can be pretreated with a hydrogen-containing gas at high temperatures and for extremely short periods of time if contact of the hot regenerated catalyst, preferably after stripping the same substantially free of combustion gases, is made with a high velocity stream of hot, hydrogen-rich gas which conveys the regenerated catalyst to the upper part of the reaction zone where the catalyst particles are rapidly separated from the pretreatment gases and deposited in the main fluidized bed of catalyst. In this way contact of freshly regenerated catalyst with hydrogen-rich gas can be kept as short as desired, the hydrogen content of the pretreating gas can be varied by dilution with inert gases to any desired extent without affecting the superficial velocity of gases and vapors through the dense fluidized catalyst bed in the reaction zone, and any water vapor formed in the pretreatment is by-passed around the dense fluidized bed thereby avoiding the poisoning effect of water vapor upon the catalyst under hydroforming reaction conditions.

Reference is made to the accompanying drawing illustrating two embodiments of the present invention.

Fig. 1 is a schematic flow plan of a reactor-regenerator system embodying a high temperature, short time catalyst pretreatment, and Fig. 2 is a modification of the reactor-regenerator system in which the pretreatment riser is arranged within the reactor vessel.

In Fig. 1, 10 is a reactor vessel provided at the bottom with an inlet line 11 for the introduction of hot hydrogen-rich or recycle gas. A perforated plate or distributor grid 12 is arranged within the vessel for insuring uniform distribution of the incoming recycle gas over the entire cross-section of the reactor vessel. A separate inlet line 13 connected to a distributor ring 13' is shown for the introduction of naphtha feed above the grid member 12, although the feed may, if desired, be introduced separately or along with the recycle gas below the grid. The reactor vessel 10 is charged with finely divided hydroforming catalyst particles and the superficial velocity of the vapors and gases through the vessel is so controlled as to form a dense, fluidized, turbulent bed of catalyst 14 having a definite level or upper surface L superposed by a dilute or disperse phase 15 comprising small amounts of catalyst entrained in vaporous reaction products. The reaction products are taken overhead from the reactor, preferably through a cyclone separator 16 or the like for separating entrained catalyst particles which are returned to the dense bed 14 via the dip leg attached to the bottom of the cyclone separator. Reaction products are conducted via outlet line 17 to suitable separating, fractionating, pressure release and/or storage equipment.

Catalyst particles are continuously withdrawn from the dense bed 14 through withdrawal conduit 18 into an external stripper vessel 19. It will be understood that the stripper could also be arranged within the reactor vessel as by providing a vertical conduit or cell, preferably extending above dense bed level L and provided with an orifice or port for controlling the discharge of catalyst into the stripper cell or conduit. A tap 20 is arranged in the lower portion of the stripper for introducing a suitable stripping gas such as steam, nitrogen, flue gas preferably washed free of carbon oxides, or other gases which will serve to remove entrained or adsorbed hydrogen or hydrocarbon materials that would otherwise be carried to the regeneration zone and burned therein. The stripping gas and stripped gases are withdrawn overhead from stripper 19 and passed through line 21 into the upper part of reactor vessel 10 in the event that substantial amounts of catalyst are entrained and recovery thereof in reactor cyclone separator 16 is desired, or through line 22 to product outlet line 17 in the event that it is desired to have the stripping gas by-pass the reactor. The lower end of the stripping vessel 19 is necked down and forms with conduit 23 connected to its lower end a standpipe for developing sufficient fluistatic pressure for offsetting the pressure drop through the regenerator side of the system. A slide valve 24 or the like is provided to control the withdrawal of catalyst from the reactor vessel and if desired or if necessary to maintain the catalyst in a fluidized state one or more gas taps can be provided along standpipe 23 to supply fluidizing gas.

The stripped spent catalyst is discharged from the base of standpipe 23 into transfer line 25 where it is picked up by a stream of regeneration gas or air and conveyed into the bottom of regenerator vessel 30. A perforated plate or grid member 31 is preferably arranged at the bottom of the regenerator vessel 30 to insure uniform distribution of the catalyst and gases over the entire cross section of the regenerator. In order to avoid overtreatment of the spent catalyst in transfer line 25 it is preferable to use only part of the air necessary for regeneration for conveying the spent catalyst through transfer line 25 and to add the remainder of the air necessary for regeneration through a separate line 32 or additional lines discharging directly into the regenerator vessel. In view of the fact that the oxidative reactions that occur in the regenerator generate more heat than can normally be transferred to the reactor by the circulating catalyst at low catalyst to oil ratios without exceeding safe temperature limits, it is ordinarily necessary to provide cooling coils in the regenerator to prevent the regenerator temperature from exceeding a safe upper limit of about 1200–1300° F. A very desirable arrangement is to provide a primary cooling coil entirely below the level L′ and a secondary coil partly below and partly above the dense bed level L′ to permit adjustment of the heat exchange capacity by simply varying the dense bed level L′ in the regenerator.

The superficial velocity of the regeneration gases through vessel 30 is so controlled as to form a dense, fluidized turbulent bed 33 of catalyst particles and gas having a definite level L′ superposed by a dilute or disperse phase 34 in the upper part of the regenerator comprising small amounts of catalyst entrained in the regeneration gases. The regeneration gases are taken overhead from regenerator 30 preferably after passage through a cyclone separator 35 or the like which serves to remove most of the catalyst particles from the gases. The catalyst particles are returned to the dense bed 33 through the dip pipe attached to the bottom of the cyclone separator. The regeneration gases, substantially free from catalyst particles, are withdrawn overhead via line 36 and passed through a pressure control valve 44 to a waste gas stack or to suitable storage equipment in the event that it is desired to use the regeneration gases for stripping purposes.

Regenerated catalyst is withdrawn from the dense bed 33 through conduit 37. Stripping gas such as air, flue gas or the like is introduced into conduit 37 through taps 38 and 39. A preferred operation is to first strip the regenerated catalyst with air, introduced at 38, to effect a final clean up of the catalyst and then with nitrogen introduced at 39 to purge the regenerated catalyst stream of air and any residual amounts of carbon monoxide or carbon dioxide.

The stripped regenerated catalyst is discharged from conduit 37 through slide valve 45 or the like into transfer line 40. Sufficient hydrogen-rich or recycle gas is supplied through line 41 to convey the regenerated catalyst through riser 42 into the top of the reactor 10. It is preferred to keep the transfer line and riser as small in diameter and as short as possible in order to keep the time of contact of the hot regenerated catalyst with the hydrogen-rich gas to a minimum. Specifically the residence time of the hot regenerated catalyst in contact with the hydrogen-rich gas should be less than about 10 seconds and preferably only about one to two seconds. The mixture of hot regenerated catalyst is discharged into a cyclone separator 43 or the like in order to disengage the hot catalyst from the hydrogen-containing gas as rapidly as possible. While this separator is shown inside the reactor it is obvious that it could be arranged externally of the reactor in which case a suitable connector pipe would be provided for conducting the separated catalyst particles into the reactor dense bed 14. The gases may be discharged from separator 43 into the dilute phase 15 or directly into cyclone separator 16 to effect further separation of catalyst particles or the gases may be passed from cyclone separator 43 to separate recovery or processing equipment.

Fig. 2 illustrates a modification of the reactor-regenerator system in accordance with the present invention. In this embodiment 110 is the reactor vessel, 111 the recycle gas inlet line, 112 the distributor grid, 113 the separate feed inlet and 113′ a distributor ring for introducing fresh feed above the grid 112. 114 is the dense fluidized bed having a definite level L or dense bed-dilute phase interface and 115 is the dilute or disperse phase in the upper part of the reactor vessel while 116 is the cyclone separator for separating entrained catalyst from the reaction products that are withdrawn from the reactor 110 through line 117 and passed to suitable product recovery, pressure release and/or processing equipment. Catalyst is withdrawn from the dense bed 114 through outlet line 118 into stripper 119 where it is contacted with suitable stripping gas introduced through inlet line 120. Stripping gas and stripped products are taken overhead from stripper 119 and discharged either through line 121 into the dilute phase 115 in the upper part of reactor 110 or through line 122 into reaction products outlet line 117 when it is desired to have the stripping gas by-pass the reactor completely.

The lower end of stripper 119 is necked down and is attached to conduit 123 forming therewith a standpipe for facilitating transfer of catalyst to the regenerator. A slide valve 124 is provided at the base of the standpipe for controlling the withdrawal of catalyst from the reactor 110. Spent catalyst is discharged from standpipe 123 into transfer line 125 where it is picked up by a stream of air and carried into regenerator vessel 130. 131 is the distributor grid and 132 is a line through which the major proportion of the regeneration air is supplied to the regenerator. 133 is the dense fluidized bed of catalyst in the regenerator, L′ is the level of the dense bed and 134 is the dilute or disperse phase in the upper part of the regenerator vessel. 135 is the cyclone separator for removing entrained catalyst from the regeneration gases while 136 is the outlet line for regeneration gases which is provided with a pressure release valve 147 and discharges regeneration gases to a flue or to storage equipment if the regeneration gases are to be used for stripping purposes. Cooling coils (not shown) preferably as described above in connection with Fig. 1 are provided in regenerator 130 to control the temperature of the regenerated catalyst.

Regenerated catalyst is withdrawn from dense bed 133 through line 137 into stripper 138. Stripping gas, for example air, is introduced into the stripper through tap 139, the stripping gas preferably passing overhead from the stripper into the upper part of vessel 130. The stripper 138 is connected to conduit 140 and forms therewith a standpipe for facilitating the transfer of regenerated catalyst to the reactor side of the system. Additional stripping gas such as nitrogen or flue gas which has been freed of carbon dioxide and carbon monoxide is introduced at 141. A slide valve 142 is provided at the base of the standpipe for controlling the discharge of stripped regenerated catalyst into transfer line 143. A stream of hydrogen-rich gas is introduced into transfer line 143 through line 144 in order to convey the regenerated catalyst through the transfer line 143 and regenerated catalyst riser 145 into the upper part of the reactor vessel. As in the case of the transfer line and riser of Fig. 1 it is advisable to keep these elements as short as possible and of as small diameter as possible in order to keep the time of contact of the hot regenerated catalyst with the recycle or hydrogen-rich gas stream to a minimum. The arrangement shown in Fig. 2 is particularly advantageous since the dense reactor bed 114 in contact with a substantial length of the regenerated catalyst riser 145 serves to exert a cooling action upon the mixture of regenerated catalyst and hydrogen-rich gas. The mixture of regenerated catalyst and hydrogen rich gas is discharged from the riser 145 substantially at the dense bed level L, preferably against a baffle 146 or the like, arranged just above the dense bed level, in order to cause a substantial separation of catalyst from the gas stream for direct addition to the top of the dense bed 114.

The feed or charging stock to the hydroforming reactor may be a virgin naphtha, a cracked naphtha, a Fischer-Tropsch naphtha or the like. The feed stock is preheated alone or in admixture with recycle gas to reaction temperature or to the maximum temperature possible while avoiding thermal degradation of the feed stock. Ordinarily preheating of the feed stock is carried out to temperatures of about 800–1050° F., preferably about 1000° F. The naphtha preheat should be as high as possible while avoiding thermal degradation thereof as by limiting the time of residence in the transfer or feed inlet lines. The preheated feed stock may be supplied to the reaction vessel in admixture with hydrogen-rich recycle gas or it may be introduced separately as shown. The recycle gas, which contains from about 50 to 70 vol. percent hydrogen, is preheated to temperatures of about 1150–1300° F., preferably about 1200° F. prior to the introduction thereof into inlet line 11. The major proportion (at least 85%) of the recycle gas is introduced directly into the bottom of the reactor vessel while a minor proportion only (at most about 15%) is introduced into the regenerated catalyst transfer and pretreater line. The recycle gas should be circulated through the reactor at a rate of from about 1000 to 8000, preferably about 4000, cu. ft. per barrel of naphtha feed.

The reactor system is charged with a mass of finely divided hydroforming catalyst particles. Suitable catalysts include Group VI metal oxides, such as molybdenum oxide, chromium oxide or tungsten oxide or mixtures thereof upon a carrier such as activated alumina, zinc aluminate spinel or the like. Preferred catalysts contain about 5 to 15 wt. % molybdenum oxide or from about 10 to 40 wt. % chromium oxide upon a suitable carrier. If desired, minor amounts of stabilizers and promoters such as silica, calcium oxide, ceria or potassia can be included in the catalyst. The catalyst particles are, for the most part, between 200 and 400 mesh in size or about 0–200 microns in diameter with a major proportion between 20 and 80 microns.

The hydroforming reactor vessel should be operated at temperatures between about 850 and 950° F., preferably about 900° F. and at pressures between 50 and 500 lbs. per sq. inch. Temperatures above 900° F. result in increased carbon formation and lower selectivity to gasoline fractions while at temperatures below about 900° F. operating severity is low and would therefore require an excessively large reaction vessel. Lowering reactor pressure below 200 lbs. per sq. inch ordinarily results in increased carbon formation which becomes excessive in most cases at pressures below about 75 lbs. per sq. inch. Above 200 lbs., however, catalyst selectivity to light products ($C_4$'s and lighter) increases rapidly.

The regenerator is operated at essentially the same pressure as the reactor and at temperatures of about 1050–1300° F. The residence time of the catalyst in the reactor may be of the order of 3–4 hours while the residence time of the catalyst in the regenerator may be from about 3 to 15 minutes. The superficial velocity of the gaseous or vaporous materials through the reaction and regeneration zones is about 0.2 to about 0.9 foot per second.

The weight ratio of catalyst to oil introduced into the reactor should be about 0.5 to 1.5. It is preferred to operate at catalyst to oil ratios of about 1 since ratios above about 1 to 1.5 result in excessive carbon formation. Somewhat higher weight ratios can be used at higher pressures.

Space velocity, or the weight of feed in pounds charged per hour per pound of catalyst in the reactor, depends upon the age or activity level of the catalyst, the character of the feed stock and the desired octane number of the product. Space velocity for a molybdenum oxide on alumina gel catalyst may vary, for example, from about 1.5 wt./hr./wt. to about 0.15 wt./hr./wt.

In order to demonstrate the effect of small amounts of water vapor upon the hydroforming reaction, a number of experiments were carried out in a batch-fluid laboratory hydroforming unit during which water vapor equivalent to that formed in pretreatment was added continuously with the hydrogen-containing gas entering the hydroforming reaction zone. The catalyst was a commercial molybdenum oxide on activated alumina, reactor temperature about 900° F. and the reaction pressure 200 lbs. per sq. inch.

These data are summarized in the following table.

*Effect of water of pretreatment on activity and selectivity of hydroforming catalysts*

| | | | | |
|---|---|---|---|---|
| C/O Ratio | ([1]) | 1 | 5 | 10 |
| Water of Pretreatment,[2] Vol. Percent on Inlet Recycle Gas | 0 | 0.7 | 3.5 | 7.0 |
| O. N. of Product at Fixed W./H./W | 92 | 91 | 90 | 88 |
| Gasoline Yield, Vol. Percent | 82.5 | 82.0 | 81 | 79 |
| Carbon Yield | 0.4 | 0.5 | 0.7 | 1.0 |

[1] Operations whereby water of pretreat does not enter reactor.
[2] Assume average of 3,000 C. F./B. of recycle gas.

It may readily be seen that the water vapor in every case lowered the yield and octane number of the product and resulted in higher carbon yields.

The foregoing description contains a limited number of embodiments of the present invention. It will be understood that numerous variations are possible without departing from the spirit of this invention.

What is claimed is:

1. In a process for hydroforming hydrocarbons in contact with finely divided hydroforming catalyst particles consisting essentially of a Group VI metal oxide on a carrier in accordance with the fluidized solids technique at temperatures between about 850° F. and 950° F., at pressures between about 50 and 500 pounds per square inch and at catalyst to oil weight ratios of about 0.5–1 to about 1.5–1, the improvement which comprises continuously withdrawing a stream of catalyst particles from the dense fluidized bed in the hydroforming reaction zone, regenerating the withdrawn catalyst particles by burning carbonaceous deposits therefrom at elevated temperatures in a separate regeneration zone, withdrawing a stream of regenerated catalyst particles from the regeneration zone, stripping the withdrawn regenerated catalyst particles substantially free of combustion gases, discharging the stripped regenerated catalyst particles into a high velocity stream of hyrogen-rich gas which rapidly conveys the regenerated catalyst to the upper part of the reaction zone, rapidly disengaging the catalyst particles from the stream of hydrogen-rich gas so that the residence time of the hot regenerated catalyst in contact with the hydrogen-rich gas stream is less than ten seconds, discharging the said stream of hydrogen-rich gas into the product vapors withdrawn from the reaction zone and rapidly depositing the disengaged regenerated and pretreated catalyst into the main dense fluidized bed of catalyst in the reaction zone.

2. In a process for hydroforming hydrocarbon fractions boiling within the motor fuel range in contact with finely divided hydroforming catalyst particles consisting essentially of a Group VI metal oxide upon a carrier in accordance with the fluidized solids technique at temperatures of between about 850° F. and 950° F., at pressures between about 50 and 500 pounds per square inch and at catalyst to oil weight ratios of about 0.5–1 to about 1.5–1, the improvement which comprises continuously withdrawing a stream of catalyst particles from a dense fluidized bed within the hydroforming reaction zone, stripping adsorbed and entrained hydrogen and hydrocarbons from the catalyst, discharging the stripped catalyst particles into a regeneration zone, regenerating the catalyst particles by burning carbonaceous deposits therefrom at temperatures of about 1100° F. to 1300° F., withdrawing a stream of regenerated catalyst particles from the regeneration zone, stripping the withdrawn regenerated catalyst particles substantially free of combustion gases, discharging the stripped regenerated catalyst particles into a high velocity stream of hydrogen-rich gas which rapidly conveys the regenerated catalyst particles to the upper part of the reaction zone and effects a pretreatment of the regenerated catalyst, rapidly disengaging the catalyst particles from the stream of hydrogen-rich gas so that the residence time of regenerated catalyst particles in contact with the hydrogen-rich gas is less than ten seconds and discharging the mixture of hydrogen-rich gas and regenerated catalyst at or above the upper surface of the main dense fluidized bed of catalyst in the reaction zone, whereby the gaseous products of pretreatment are intermingled with the vaporous reaction products in the disperse phase and thus by-pass the main fluidized bed of catalyst in the reaction zone and the regenerated and pretreated catalyst particles are rapidly deposited into the main dense fluidized bed in the reaction zone.

3. In a process for hydroforming hydrocarbon fractions boiling within the motor fuel range in contact with finely divided hydroforming catalyst particles consisting essentially of a Group VI metal oxide upon a carrier in accordance with the fluidized solids technique at temperatures of between about 850° F. and 950° F., at pressures between about 50 and 500 pounds per square inch and at catalyst to oil weight ratios of about 0.5–1 to about 1.5–1, the improvement which comprises continuously withdrawing a stream of catalyst particles from a dense fluidized bed within the hydroforming reaction zone, stripping adsorbed and entrained hydrogen and hydrocarbons from the catalyst, discharging the stripped catalyst particles into a regeneration zone, regenerating the catalyst particles by burning carbonaceous deposits therefrom at temperature of from 1100° F. to 1300° F., withdrawing a stream of regenerated catalyst particles from the regeneration zone, stripping the withdrawn regenerated catalyst particles substantially free of combustion gases, discharging the stripped regenerated catalyst particles into a high velocity stream of hydrogen-rich gas, passing the resultant mixture of regenerated catalyst and hydrogen-rich gas at high velocity in indirect heat exchange to the dense fluidized bed within the reaction zone, whereby the regenerated catalyst particles are rapidly conveyed to the upper part of the reaction zone while undergoing pretreatment, rapidly disengaging the catalyst particles from the stream of hydrogen-rich gas so that the residence time of regenerated catalyst particles in contact with the hydrogen-rich gas at less then 10 seconds and discharging the said mixture is or above the upper surface of the main dense fluidized bed of catalyst in the reaction zone whereby the gaseous products of pretreatment are directly intermingled with the vaporous reaction products in the disperse phase and thus by-pass the main fluidized bed of catalyst in the reaction zone and the regenerated and pretreated catalyst particles are rapidly deposited in the main dense fluidized bed of catalyst particles in the reaction zone.

References Cited in the file of this patent

UNITED STATES PATENTS

| | | |
|---|---|---|
| 2,366,372 | Voorhees | Jan. 2, 1945 |
| 2,410,891 | Meinert et al. | Nov. 12, 1946 |
| 2,459,824 | Leffer | Jan. 25, 1949 |
| 2,472,844 | Munday et al. | June 14, 1949 |